United States Patent [19]

Kim et al.

[11] Patent Number: 5,516,302
[45] Date of Patent: May 14, 1996

[54] END FEED CONNECTOR FOR PRE-BUSSED RIGID CONDUIT

[75] Inventors: Han Kim, Cincinnati; Aubrey Bryant, Liberty; Steven F. Reed, Oxford, all of Ohio; Robert I. Whitney, Brookville, Ind.

[73] Assignee: Square D Company, Palatine, Ill.

[21] Appl. No.: 206,817

[22] Filed: Mar. 7, 1994

Related U.S. Application Data

[63] Continuation-in-part of Ser. No. 85,341, Jun. 30, 1993.
[51] Int. Cl.$^6$ ............................................. H01R 4/60
[52] U.S. Cl. ............................ 439/210; 439/95; 439/810
[58] Field of Search .................................. 439/599, 600, 439/891, 190, 191, 193, 194, 810, 814, 696, 701, 210–212, 110, 810, 92, 95

[56] References Cited

U.S. PATENT DOCUMENTS

| | | | |
|---|---|---|---|
| 3,170,752 | 2/1965 | Van Horssen | 439/891 |
| 3,748,632 | 7/1973 | Tanges, Jr. | 439/891 |
| 4,708,201 | 11/1987 | Reed | 439/191 |
| 4,799,544 | 1/1989 | Curlett | 439/191 |
| 5,211,589 | 5/1993 | McCardell | 439/891 |
| 5,346,406 | 9/1994 | Hoffmann et al. | 439/891 |

*Primary Examiner*—David L. Pirlot
*Attorney, Agent, or Firm*—Larry I. Golden; Larry T. Shrout; David Russell Stacey

[57] ABSTRACT

An end feed connector for connecting a plurality of feed lines to a pre-bussed rigid conduit which has feed line connectors that fit in slots in an insulating housing. Within the housing, the slots communicate with conductive sleeves that are disposed in the pattern of the pre-bussed rigid conduit with which the end feed connector is intended to mate. Bus bars within the housing connect the feed line connectors to the sleeves.

5 Claims, 2 Drawing Sheets

END FEED CONNECTOR FOR PRE-BUSSED RIGID CONDUIT

This application is a continuation-in-part of application Ser. No. 08/085,341, filed Jun. 30, 1993 and is incorporated herein by reference.

BACKGROUND OF THE INVENTION

Field of the Invention

The technical field to which this invention pertains is electrical distribution feeder systems for use in industrial and commercial locations, and more particularly to an improved end feed connector for pre-bussed rigid conduit.

Description of the Prior Art

In the past, industrial and commercial electrical distribution feeder systems have generally employed cable and conduit, cable and cable tray, cable and wireway, or electrical busway. Where cable is used with conduit, the conduit must first be installed and then cables are pulled through it to complete the installation. Cable used with cable tray or wireway again involves the installation of the cable tray or wireway first and then laying of cables in the tray or wireway to complete the installation. Busway installations are generally simpler than cable and conduit or cable and tray or wireway since the conductors are already inside the protective enclosure and require no additional labor after the enclosure is installed. Busway designs of the past have generally included a number of bus bars having a rectangularly-shaped cross-section placed parallel to one another in a common plane and installed in a rectangularly shaped enclosure. The sections of busway are produced in specific lengths which can not be altered in the field during installation. For this reason, if special lengths are required they must be engineered and manufactured at the factory. This special engineering and manufacturing requires additional time for shipment to the job site and generally an increase in cost to the customer.

SUMMARY OF THE INVENTION

The present invention provides an alternative to cable and conduit, cable and tray, and busway designs for electrical feeder systems, particularly in the ampacity range of approximately 60 to 800 amperes. Particularly, it provides an improved end feed connector for connecting relatively flexible feed lines to a pre-bussed rigid conduit system.

In one embodiment of the present invention, an electrical feeder system includes one or more lengths of a generally cylindrical tubular enclosure which can be similar in construction to conventional metallic conduit. Disposed within the enclosure are a plurality of substantially rigid electrical conductors.

The pre-bussed rigid conduit sectionalized electrical distribution system of the present invention is a combination of both conduit and busway. However, the system of the present invention has significant advantages over the prior art systems from which it was derived, particularly in the ampacity range of 60 to 800 amperes.

One advantage of the electrical distribution system of the present invention is that the positioning of the conductors in the cylindrical enclosure permits a generally smaller and stronger enclosure than that usually employed in busway devices of the same current carrying capacity. The pre-bussed rigid conduit enclosure of the present invention is also generally smaller than that required for cable and conduit of the same current capacity.

Another advantage of the pre-bussed rigid conduit of the present invention is that it can be manufactured in specific lengths to facilitate easy handling and installation; however, unlike prior art busway systems, the pre-bussed rigid conduit of the present invention can be easily field modified with hand tools to lengths as short as 4 inches.

Yet another advantage of the present invention is that the enclosure can also provide a water resistant environment for the electrical conductors enclosed therein when assembled with standard waterproof electrical conduit fittings.

Specifically, the present invention contemplates the provision of an end feed connector for connecting a plurality of feed lines to a pre-bussed rigid conduit in which feed line connectors fit in slots in an insulating housing. Within the housing, the slots communicate with conductive sleeves that are disposed in the pattern of the pre-bussed rigid conduit with which the end feed connector is intended to mate. Bus bars within the housing connect the feed line connectors to the sleeves.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
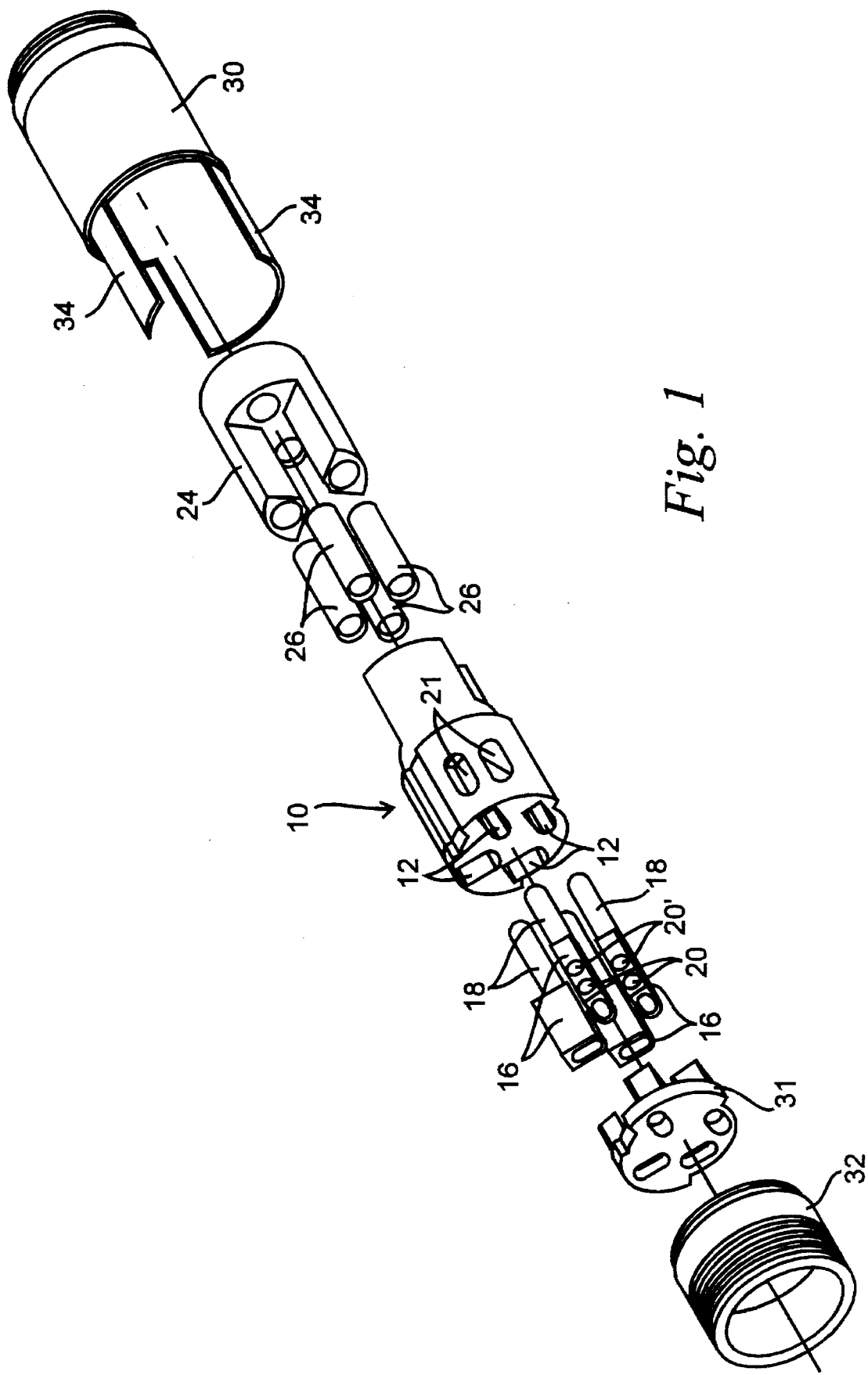
FIG. 1 is an isometric, exploded view of an end feed connector assembly in accordance with the teachings of this invention.
Figure 2:
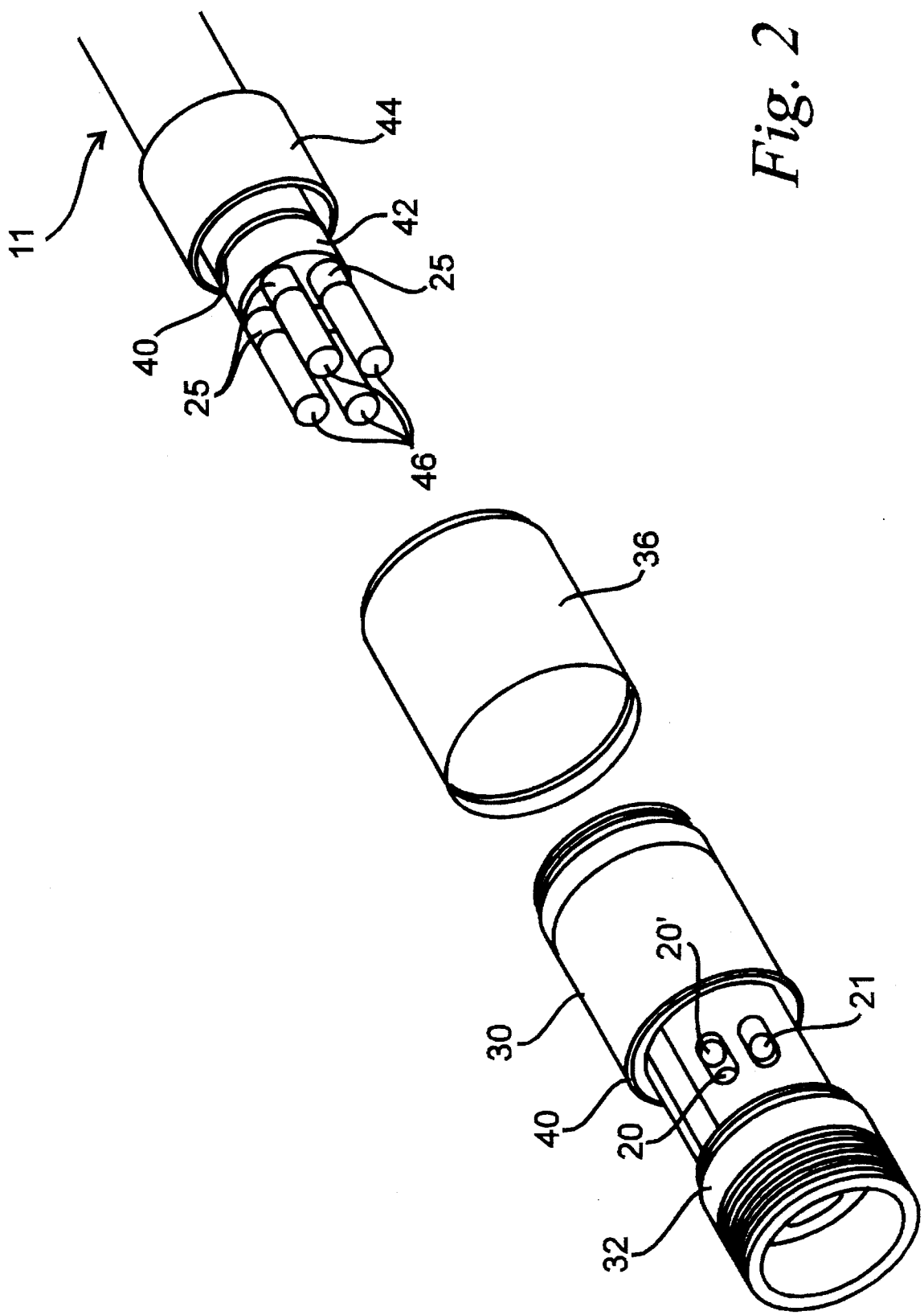
FIG. 2 is an isometric view of the end feed connector assembly shown in FIG. 1 when it has been assembled.

Referring now to the drawings. FIG. 1 shows an exploded view of one embodiment of an end feed connector in accordance with the teachings of this invention. The feed connector comprises a insulating support housing indicated by the general reference number 10. The housing 10 is preferably made of a suitable thermosetting plastic material and has, in this embodiment of the invention, four slots 12 for receiving, respectively, four line feed connectors 16. It will be appreciated that the number of slots and line feed connectors is determined by the number of bus bars in the pre-bussed conduit (indicated by general reference numeral 11 in FIG. 2) to which the end feed connector is to be connected. Each connector 16 connects a relatively flexible conventional feed line (not shown) to a bus bar 18, which is connected to one end of the connector.

Each connector 16 comprises a small block of conductive material, such as aluminum, with a central passage extending through it. Screws (not shown) are inserted into threaded apertures 20 and 20' in each connector 16 in order to secure, respectively, a feed line and a bus bar 18 to the block, thus making a mechanical and electrical connection between the two. The screws are accessible through openings 21 in the housing 10.

The housing 10 in combination with an insulating coupling half member 24 also houses four conductive connector sleeves 26. This combination that includes the rear portion housing 10, sleeves 26, and half member 24 is essentially the same as the joint connecting member disclosed in FIGS.

9–11 of the aforementioned application, serial number 08/085,341, of which this application is a continuation-in-part. The rear portion of housing 10 and coupling half member 24 are substantially identical and interlock together to form a substantially cylindrical housing for the conductive sleeves 26. The passageways formed by the mating members are dimensioned to tightly receive the sleeves 26, which are preferably "C"-shaped in cross-section so that they are tightly compressed in the passageways. The sleeves are themselves dimensioned so that they tightly receive the bus bars 18 at one end and the bus bars 25 of the pre-bussed rigid conduit 11, shown in FIG. 2. The slots 12 are aligned with sleeves 26 when the assembly is complete, so that the bus bars 18 extend part way into the sleeves and are tightly engaged thereby.

An elongated cast aluminum shell 30 slides over the assembly from one end and a somewhat shorter cast aluminum threaded shell 32 slides over the assembly from the other end for conducting a ground current. Screws are used to secure the shell 32 to the upper and lower tangs 34 that extend from the shell 30. The tangs provide openings through which the connector screws can be accessed. An insulating cap 31 helps secure the connectors 16 in the slots 12. These openings are covered by a removable access shell 36 that fits over the shell 30 and screws onto the shell 32. A gasket 40 provides a seal between the access shell 36 and the shell 30.

As explained in more detail in co-pending application Ser. No. 08/085,341, the pre-bussed conduit 11 preferably has an extruded aluminum outer covering 40. A foam insulator 42 supports the conductors 25 within the housing in a predetermined pattern and a coupling sleeve 44 is used to secure the pre-bussed rigid conduit 11 to the end feed connector. The bus bars 25 themselves are preferably aluminum with copper tips 46 at the ends where they are to be connected to the end feed connector.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An end feed connector for connecting a plurality of feed lines to a pre-bussed conduit, comprising in combination:
   a electrically insulated support housing;
   a plurality of slots extending in said housing from one end to the other end thereof;
   a plurality of electrically conducting connector sleeves disposed respectively in said plurality of slots;
   said housing supporting said sleeves in a predetermined pattern that matches a pattern of conductors in a pre-bussed conduit;
   a plurality of bus bars disposed in said housing, with one end of each said plurality of bus bars respectively inserted into one of said electrically conducting connector sleeves;
   a plurality of conductive clamps disposed respectively in said plurality of slots and connected respectively to the other end of said plurality of bus bars, each of said conductive clamps including means to secure said conductive clamp to a feed line; and
   an electrically conductive outer shell for partially enclosing said housing and conducting a ground current.

2. An end feed connector as in claim 1, further including a plurality of openings in said housing through which said means to secure can be accessed in order to secure a feed line in one of said conductive clamps.

3. An end feed connector as in claim 1, wherein said electrically insulating support housing comprises two mating segments that nest together to form said plurality of slots to support said sleeves.

4. An end feed connector as in claim 1, wherein said sleeves are "C"-shaped in cross-section.

5. An end feed connector for connecting a plurality of feed lines to a pre-bussed conduit, comprising in combination:
   a electrically insulating support housing;
   a plurality of slots extending in said housing from one end to the other end thereof;
   a plurality of electrically conducting connector sleeves disposed respectively in said plurality of slots;
   a pre-bussed conduit comprising an outer sheath, a plurality of pre-bussed bus bars, and means supporting said pre-bussed bus bars in a predetermined pattern;
   said housing supporting said sleeves in a predetermined pattern that matches said predetermined pattern;
   a plurality of bus bars disposed in said housing, with one end of each of said plurality of bus bars respectively inserted into one of said electrically conducting connector sleeves; and
   a plurality of conductive clamps disposed respectively in said plurality of slots and connected respectively to the other end of said plurality of bus bars, each of said conductive clamps including means to secure said conductive clamp to a feed line; and an electrically conductive outer shell for partially enclosing said housing and conducting a ground current.

* * * * *